United States Patent [19]

Gosselin et al.

[11] Patent Number: 5,456,953

[45] Date of Patent: Oct. 10, 1995

[54] METHOD FOR COATING BAKE HARDENABLE STEEL WITH A WATER BASED CHROMIUM BEARING ORGANIC RESIN

[75] Inventors: Cynthia A. Gosselin; Frederick A. Myers, both of Middletown, Ohio

[73] Assignee: Armco Steel Company, L.P., Middletown, Ohio

[21] Appl. No.: 23,237

[22] Filed: Feb. 26, 1993

[51] Int. Cl.[6] .................................................. B05D 3/02
[52] U.S. Cl. .................... 427/522; 427/544; 427/386; 427/388.2; 427/388.4; 148/251
[58] Field of Search ........................ 148/251; 427/522, 427/544, 386, 388.2, 388.4

[56] References Cited

U.S. PATENT DOCUMENTS

| | | | |
|---|---|---|---|
| 4,637,840 | 1/1987 | Fujii et al. | 148/251 |
| 4,971,636 | 11/1990 | Watenabe et al. | 148/265 |
| 5,001,173 | 3/1991 | Anderson et al. | 523/406 |
| 5,151,297 | 9/1992 | Robbins et al. | 427/46 |

FOREIGN PATENT DOCUMENTS

| | | | |
|---|---|---|---|
| 1186959 | 5/1985 | Canada | 427/522 |
| 230320 | 7/1987 | European Pat. Off. . | |
| 453374 | 10/1991 | European Pat. Off. . | |
| 5375133 | 7/1978 | Japan | 427/544 |
| 2145774 | 6/1990 | Japan . | |
| 3092342 | 4/1991 | Japan . | |
| 1472079 | 4/1977 | United Kingdom | 427/544 |
| 2239196 | 6/1991 | United Kingdom . | |

OTHER PUBLICATIONS

"Induction Furnaces", Kirk–Othmer Encyclopedia of Chemical Technology, vol. 11, pp. 542–550, 1979.

Primary Examiner—Terry J. Owens
Assistant Examiner—Erma Cameron
Attorney, Agent, or Firm—R. J. Bunyard; L. A. Fillnow; R. H. Johnson

[57] ABSTRACT

A bake hardenable steel sheet ready for deep drawing is coated on at least one side with a continuous chromium bearing epoxy coating. The sheet is roll coated with continuous liquid film containing at least 2 wt. % of a water dispersible or emulsifiable epoxy resin or a mixture of resins containing the epoxy resin, at least 0.5 wt. % of a chromium compound and 25–97 wt. % of water. The liquid coated sheet is induction heated at a temperature of 149–227° C. for sufficient time to form a coating resistant to dissolution of chromium and a steel base metal having a yield point elongation no greater than 0.3% and retaining good bake hardenability characteristics. The chromium bearing epoxy coating is impervious to moisture, can readily be welded and possesses sufficient toughness and lubricity to allow deformation of the sheet without additional external lubricant. A deeply drawn article formed from the sheet has enhanced painting characteristics.

15 Claims, 3 Drawing Sheets

5,456,953

METHOD FOR COATING BAKE HARDENABLE STEEL WITH A WATER BASED CHROMIUM BEARING ORGANIC RESIN

BACKGROUND OF THE INVENTION

This invention relates to a process for coating in one step a bake hardenable, bare or metallic coated, steel sheet with an induction cured thermosetting coating. More particularly, the coating is formed from an aqueous solution containing a thermosetting polymer and a chromium compound. The coating is formable, impervious to moisture, resistant to dissolution of the chromium and is capable of being bonded with a top coating of paint or adhesive.

It is known to pretreat and/or prepaint steel substrates for improving corrosion resistance prior to post painting. The pretreatment generally is a two step process including initially applying a dried-in-place inorganic chromium primer having a weight of about 0.75 g/m$^2$ or more followed by baking of a solvent based organic liquid coating, e.g., epoxy containing a silicate, having a weight of about 0.5–1.1 g/m$^2$. The chromium layer beneath the organic layer is desirable because it retards the formation of corrosion products by inhibiting the hydration of metallic oxides. The organic topcoat provides additional barrier protection and is necessary to prevent dissolution of the chromium from the primer layer.

Electroplating steel sheets with zinc nickel forms a relatively brittle metal coating that may have inferior adherence during stamping of the sheet and subsequent poor corrosion resistance. Applying an organic coating over the zinc nickel coating prior to painting of the sheet acts a barrier film inhibiting catastrophic corrosion during field service. Without the organic coating, it would be necessary to increase the thickness of the metallic coating to insure the necessary corrosion resistance. An increase of the metallic coating thickness, however, could adversely affect welding and formability of the sheet. U.S. Pat. No. 4,971,636 discloses coating a zinc coated steel sheet with a composite coating of chromium and epoxy resin using a two step process. The zinc coated steel is rinsed with a chromic acid solution, dried, coated with an aqueous solution containing epoxy and silica and the epoxy coated steel then is baked.

In a more recent development, U.S. Pat. No. 5,001,173; incorporated herein by reference, discloses a steel sheet pretreated in a one step process with an organic coating containing chromium. The coating is applied from a solution of 2–25 wt. % of an organic resin component containing at least one water dispersible or emulsifiable epoxy resin or a mixture of resins containing more than 50 wt. % of at least one water dispersible or emulsifiable epoxy resin, 0.5–5 wt. % chromium trioxide and 25–97 wt. % water. The liquid coated sheet is dried at a baking temperature of 93°–260° C. forming a flexible crack resistant coating impervious to moisture. The epoxy coating can be welded and adhesively bonded with an outer top coating of paint.

In recent years, automobile manufacturers have required steel sheet to have a property known as bake hardenability. After the steel is pretreated with paint primer, lubricant, and the like, the steel is formed into a part. Thereafter, the formed part is painted and baked at an elevated temperature to cure the paint. Certain steels have a capacity for a significant increase in yield strength by the combination of work hardening during forming the part and strain aging when the work hardened steel is subjected to an overaging treatment, i.e., heated to an elevated temperature. By bake hardenable is meant a steel that exhibits this increase of yield strength when being formed into a part and subsequently heated at an elevated temperature to cure the paint. Bake hardenable steels have become popular with automobile manufacturers because the increase in yield strength increases dent resistance of the part without sacrificing formability and permits use of relatively thin steel sheets thereby assisting in weight reduction of a vehicle. Unfortunately, formability and bake hardenability of a steel may deteriorate if the steel is heated to a temperature of about 165° C. prior to forming the part, especially if the steel is pretreated with a two step process. Steels heretofore pretreated with an organic coating prior to forming the steel into a part require the pretreated steel to be baked at an elevated temperature. For a pretreatment that includes hexavalent chromium in the liquid coating, the baking temperature may be insufficient to completely reduce the unstable chromium in the liquid to stable trivalent chromium in the cured coating. When not sufficiently reduced, chromium tends to dissolve during subsequent processing steps causing contamination of cleaning, pretreatment and rinsing solutions. This contamination is undesirable because the waste solutions are environmentally unacceptable and disposition is expensive. Chromium contamination in these solutions also may inhibit cleaning and pretreatment of the steel leading to poor paint adhesion and/or corrosion resistance on the vehicle. For pretreatments requiring a two step process, the steel tends to lose its formability and bake hardenability properties at temperatures above 165° C. because the steel must be heated twice. That is, the steel is heated to dry-in-place the inorganic chromium layer and then is baked to cure the organic coating. For a two step pretreating process, the baking temperature must be restricted to less than 165° C.

Accordingly, there remains a need for a steel sheet pretreated with a chromium bearing organic coating wherein the coating provides good corrosion resistance and the steel base metal retains good bake hardenable properties. There remains a further need for a pretreated bake hardenable steel sheet wherein chromium in the organic coating will not dissolve during subsequent processing of the sheet. Ideally, the organic coating needs good formability, enhanced painting characteristics and sufficient lubricity so that additional lubricant is not required during stamping of the coated steel into a part.

BRIEF SUMMARY OF THE INVENTION

A principal object of the invention is to provide a steel sheet pretreated with a chromium bearing organic coating wherein the steel base metal retains good bake hardenability characteristics.

Another object of the invention is to provide a bake hardenable steel sheet pretreated with a chromium bearing organic coating wherein the chromium is reduced to prevent dissolution from the coating.

Additional objects include a chromium bearing organic coating that has a low coefficient of friction, is weldable, is corrosion resistant, is formable, has good powdering resistance and has good electrocoat and adhesive compatibility and adhesion.

A bake hardenable steel sheet ready for deep drawing is coated on at least one side with a chromium bearing organic coating. The sheet is coated with a continuous liquid film from an aqueous solution containing at least 2 wt. % of a water dispersible or emulsifiable thermosetting resin or a mixture of resins containing the thermosetting resin, at least 0.5 wt. % of a chromium compound and 25–97 wt. % of water. The liquid coated sheet is induction heated at a temperature of 149°–227° C. for sufficient time to form an organic coating that is impervious to moisture, resistant to dissolution of chromium, has enhanced painting characteristics and the base metal of the sheet has a yield point elongation no greater than 0.3% and retains good bake hardenability characteristics.

Another feature of the invention includes heating the aforesaid sheet to 182°–224° C. and the base metal having no yield point elongation.

Another feature of the invention includes the aforesaid solution containing at least 10 wt. % epoxy resin.

Another feature of the invention includes the aforesaid sheet coated on the one side with at least 0.7 g/m$^2$ of the organic coating.

Another feature of the invention includes the aforesaid organically coated sheet having a coefficient of friction no greater than 0.15.

Advantages of the invention include forming an organically coated steel having excellent paint adhesion without using or creating waste materials that are environmentally unacceptable and not economically easy to dispose of, an organically coated steel that can be welded and bonded with outer electrocoated paints or adhesives, an organic coating having a sufficiently low coefficient of friction so that the need for additional lubricant when press forming the organically coated steel may not be required and an organic coating that is not sensitive to moisture.

DETAILED DESCRIPTION OF THE PREFERRED EMBODIMENT

Figure 1:
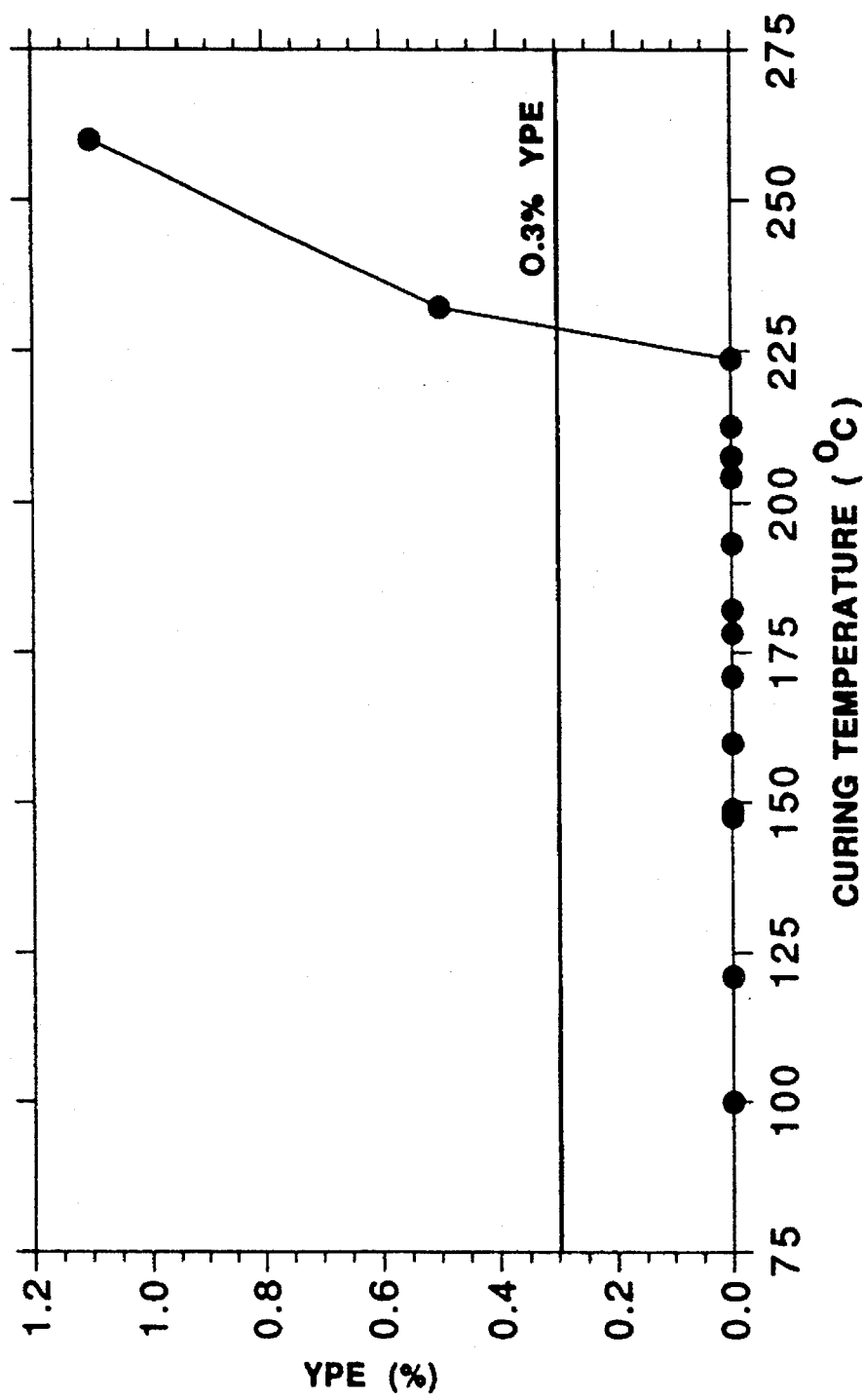
FIG. 1 graphically illustrates the yield point elongation of a steel after being pretreated with a one step chromium bearing epoxy coating of the invention as a function of curing temperature, FIG. 2 graphically illustrates chromium dissolution of the coating of FIG. 1, FIG. 3 graphically illustrates the bake hardenability of the steel of FIG. 1.

We have discovered that a bake hardenable steel to be painted can be pretreated in a one-step process with a chromium bearing organic coming and be baked to a solid film wherein the chromium will not be dissolved during subsequent processing and the steel base metal retains its bake hardening characteristics. More particularly, we discovered when the pretreated steel was induction heated to at least 149° C., the chromium was reduced to a stable form within the cured coating. When the pretreated steel was induction heated to no greater than 227° C., the steel did not age, i.e., did not have a yield point elongation, and the bake hardening property of the base metal was not deteriorated.

The organic coating of our invention can be formed from an aqueous solution containing a thermosetting resin and a chromium compound. Such a solution is disclosed in U.S. Pat. No. 5,001,173; incorporated herein by reference. Preferably, the solution includes at least 2 wt. % of a water dispersible or emulsifiable epoxy resin or a mixture of resins containing the epoxy resin, at least 0.5 wt. % of chromium trioxide and 25–97 wt. % of water. More preferably, the solution includes at least 10 wt. % of the epoxy resin and at least 3 wt. % of the chromium trioxide. Other cross-linked polymeric resins that may be used with our invention include polyesters, urethanes and phenolics. In addition to epoxy and chromium oxide, the aqueous solution may contain small amounts of one or more auxiliary substances such as rust inhibitors, wetting agents, wax, antifoaming agents, phosphoric acid, metal powder, silica, graphite and coloring agents.

The process of the invention can be applied to bake hardenable, low carbon steel sheet such as hot rolled and pickled steel, cold rolled steel and hot dipped or electroplated metallic coated steel. Metallic coatings may include zinc, zinc alloy, aluminum, aluminum alloy, lead, lead alloy, tin, tin alloy, and the like. By sheet is meant to include continuous strip or foil and cut lengths. The invention has particular utility for cold rolled, box annealed steel that is two side electroplated with a zinc nickel coating.

Conventional coating equipment such as a reverse roll coater, direct coating, spraying, dipping, bar coating, and the like may be used to form a chromium bearing organic coating on one or both sides of a steel sheet. Preferably, a steel sheet is continuously reverse roll coated with a liquid film of an aqueous solution containing epoxy and chromium trioxide. The liquid coated sheet is dried by being passed through an induction heater wherein the steel substrate is heated to a temperature of 149°–227° C., preferably in less than 5 seconds. After passing from the induction heater, the steel sheet remains at the baking temperature for sufficient time both to allow the epoxy coating to become cured and for the chromium to be reduced within the epoxy coating. Thereafter, the epoxy coated steel preferably is liquid or air quenched within 30 seconds to ambient temperature to prevent any aging which would tend to deteriorate the formability or bake hardenability properties of the steel base metal. We have determined chromium becomes substantially reduced by inductively heating the liquid coating for as little as 2 seconds at 149° C. and chromium becomes completely reduced at 182° C. When the liquid coated steel is baked at 227° C., the yield point elongation of the base metal does not exceed 0.3%. When the liquid coated steel preferably is baked at a temperature as low as 224° C., the steel does not have any yield point elongation. The epoxy coating is cured and the chromium is reduced to a stable form within the epoxy coating immediately after passing from the induction heater.

An epoxy coating is desirable because it generally has sufficient lubricity to obviate applying additional external lubricant to the pretreated sheet or the stamping presses immediately prior to forming a part and is compatible with many paints.

For enhanced corrosion resistance, it is desirable that the steel sheet be galvanized prior to being pretreated with the epoxy coating. More preferably, the zinc coating is an electroplated alloy of about 90–84 wt. % zinc and 10–16 wt. % nickel of at least 10 g/m$^2$ on each side of the sheet. The weight of the chromium bearing epoxy coating should be at least about 0.7 g/m$^2$ in order to achieve sufficient corrosion resistance and continuous film coverage over the entire surface of the sheet. The weight of the chromium bearing epoxy coating should not exceed about 1.4 g/m$^2$ because welding of the sheet may be adversely affected. More preferably, the weight of the organic coating should be in the range of 0.8–1.2 g/m$^2$.

We determined induction heating advantageously can be used to cure the organic coating at a higher temperature to reduce chromium to a stable form more quickly without deteriorating the bake hardenable characteristic of the steel than otherwise would be possible with a convection heating oven. Another advantage of induction curing is very short baking times can be used. A convection heating oven requires much longer baking times tending to deteriorate the bake hardenable characteristic of the steel. Higher coating line speeds would be possible and less floor space needed when using induction heating.

The following example will better illustrate the invention. A temper rolled, aluminum killed, cold rolled steel sheet having a thickness of 0.8 mm was electroplated with 20 g/m² zinc nickel alloy on each side on a production line. After being slit to a width of 23 cm, one side of the sheet was pretreated with a chromium bearing organic coating on a laboratory coating line. The sheet was pretreated with an aqueous solution provided by Morton Coatings, Inc. of Chicago, Ill. sold under the trade designation FirstCoat MP. The solution contained about 17 wt. % emulsified epoxy, about 5 wt. % chromium trioxide and the balance essentially water. The zinc nickel coated sheet was pretreated by being passed through a reverse roll coater including a ceramic pickup roll and a rubber applicator roll having a hardness of 55 Durometer. The pickup roll transferred the liquid chromium bearing epoxy from a pan to the applicator roll which transferred the liquid to one side of the sheet. Thereafter, the one-side pretreated sheet was passed through a 35 cm long, 200 kw helical induction coil at a speed of about 9.1 m/min and incrementally heated from 100° C. to 260° C. to determine the mechanical properties of the steel. Peak metal temperature was achieved in about 2 seconds. After an additional 12 seconds had lapsed, the sheet was water quenched to ambient temperature.

Samples of the epoxy coated steel were evaluated for return of yield point, chromium dissolution and bake hardenability. Yield point was determined by yield point elongation (YPE) as measured during a tensile test. Chromium dissolution was determined by immersing chromium bearing epoxy coated samples for four minutes in a standard automotive alkaline cleaner maintained at 49° C. Dissolution of chromium was determined by analyzing for chromium in the epoxy coating using x-ray fluorescence before and after rinsing the samples in the alkaline cleaner. Chromium dissolution as measured by this test compared favorably to that when analyzing for chromium before and after passing the epoxy coated samples through an entire automotive cleaning and pretreatment section. Bake hardenability (BH) was determined by measuring the yield strength of the steel after being stretched 2% for simulating stamping into a part and then reheated to 171° C. for simulating baking of the painted part.

Figure 2:
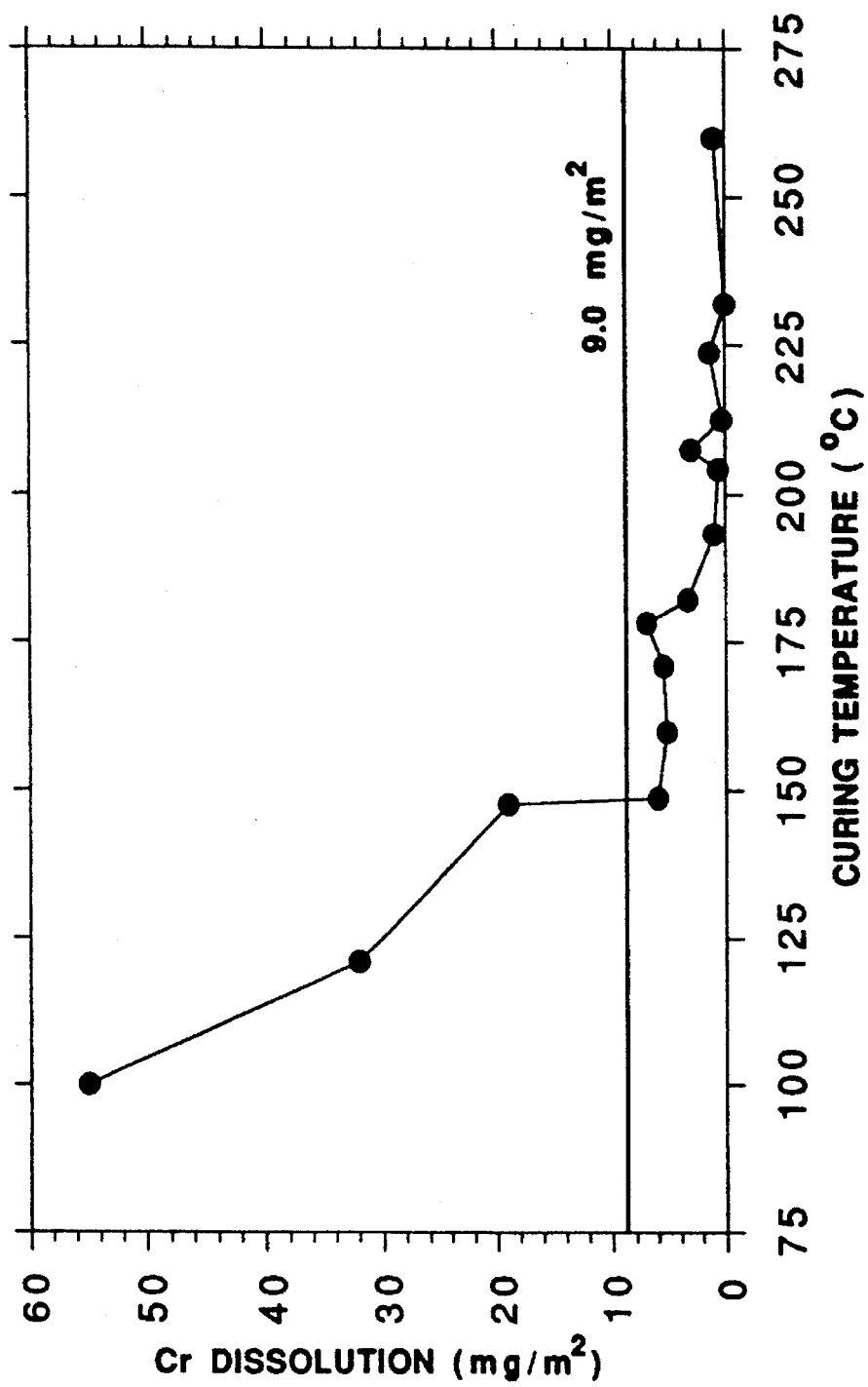

Results of these tests are shown in Table 1 below and are graphically illustrated in FIGS. 1–3.

TABLE 1

| Cure Temp. °C. | YPE | BH Index | Cr Dissolution |
|---|---|---|---|
| 260 | X | | O |
| 232 | X | O | O |
| 224 | O | O | O |
| 213 | O | O | O |
| 208 | O | O | O |
| 193 | O | O | O |
| 182 | O | O | O |
| 178 | O | O | Δ |
| 171 | O | O | Δ |
| 160 | O | O | Δ |

TABLE 1-continued

| Cure Temp. °C. | YPE | BH Index | Cr Dissolution |
|---|---|---|---|
| 149 | O | O | Δ |
| 148 | O | | X |
| 121 | O | | X |
| 100 | O | | X |

O = good
Δ = marginal
X = unacceptable

It is known that a maximum of 0.3% yield point elongation (YPE) during a standard tensile test for steel is an indication that the formability and bake hardenable properties have not deteriorated. FIG. 1 illustrates the YPE of the epoxy coated steel as a function of the curing temperature of the epoxy coating. It was determined the steel could be heated as high as 227° C. without causing the YPE to exceed 0.3% and as high as 224° C. without any YPE.

It previously had been established that 9.0 mg/m² is the maximum amount of chromium dissolution permitted to insure that the cleaning, pretreatment and painting sections of an automotive assembly plant will not become contaminated with chromium. FIG. 2 illustrates that the steel could be baked to a temperature as low as 149° C. in about 2 seconds and maintained at this temperature for as little as an additional 12 seconds without causing dissolution of chromium to exceed 9.0 mg/m². Preferably, chromium dissolution should not exceed 5.0 mg/m². A temperature of at least 182° C. was determined to sufficiently reduce hexavalent chromium in the liquid to trivalent chromium in the solid epoxy film to achieve the latter degree of chromium dissolution.

Figure 3:
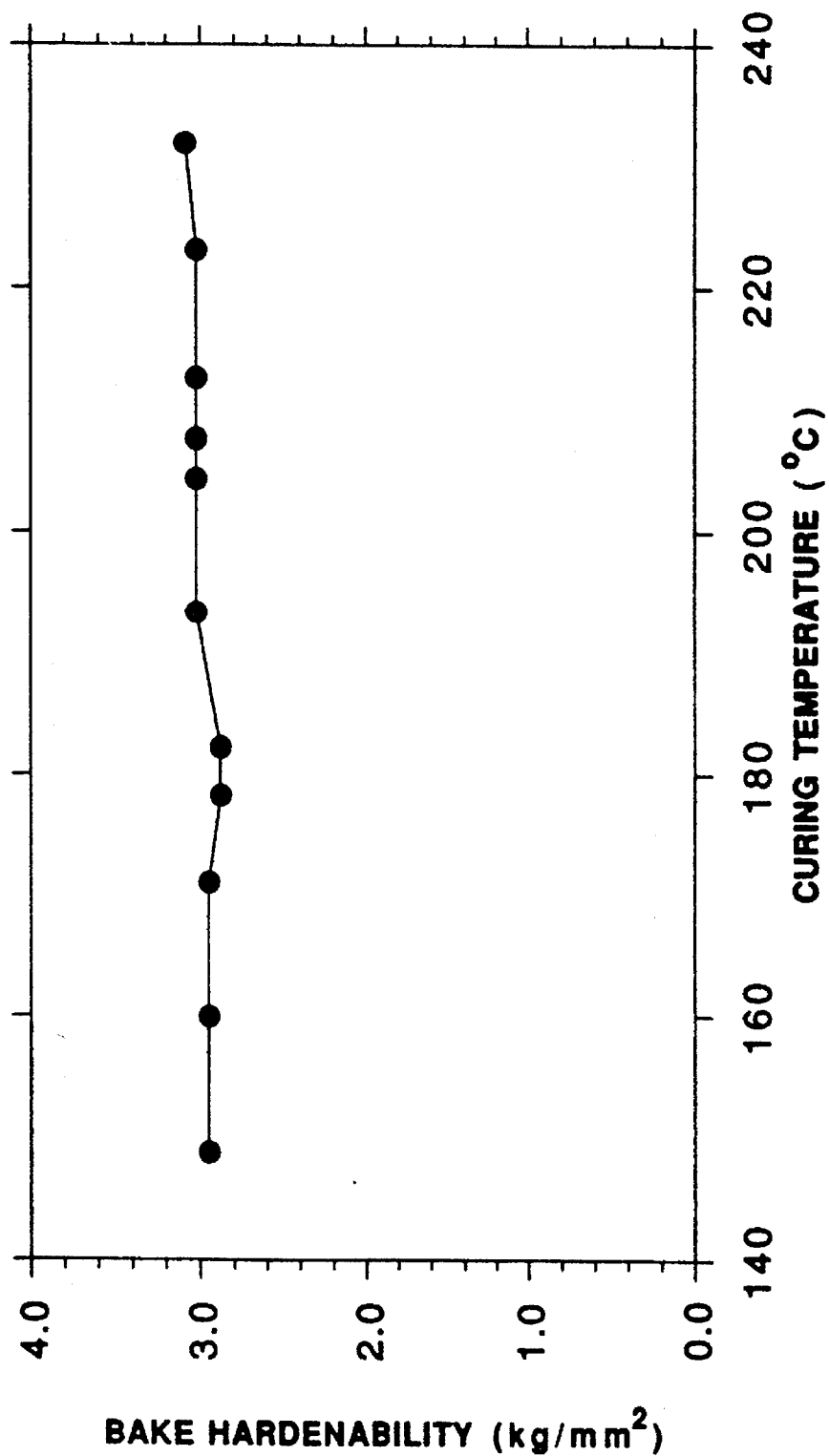

FIG. 3 illustrates bake hardenability of the chromium bearing epoxy coated samples after being stretched 2% then reheated to 171° C. for 30 minutes. In the epoxy curing temperature range of 149°–224° C., the steel base metal had an increase in yield strength of about 2.8–3.2 kg/mm².

Several of the chromium bearing epoxy coated samples also were evaluated for paint adherence. Paint adherence was determined by treating the samples with a standard automotive phosphating system, applying electrocoat paint, baking the paint and then using a crosshatch test. After the epoxy coated samples were painted and baked at 171° C. for 30 minutes, they were soaked 10 days in water maintained at 40° C. Thereafter, the samples were scribed in a crosshatch manner by scribing each sample with a series of 10 parallel lines spaced apart 2 millimeters in a first direction and then scribing with another series of 10 parallel lines having the same spacing that perpendicularly intersected the first lines, i.e., forming 100 squares. After being scribed, adhesive tape was applied to the crosshatch area. Adherence was determined by counting the number of squares adhered to the tape when the tape was removed from the crosshatched samples. No delamination occurred at any of the interfaces of any of the samples.

It will be understood various modifications can be made to the invention without departing from the spirit and scope of it. Therefore, the limits of the invention should be determined from the appended claims.

What is claimed is:

1. A method of forming a corrosion resistant organic coating on at least one side of a steel sheet, including the steps of:

providing an aqueous solution comprising at least 2 wt. % of a water dispersible or emulsifiable thermosetting resin or a mixture of resins containing the thermosetting resin, at least 0.5 wt. % of a chromium compound and 25–97 wt. % of water, coating a continuous liquid film of the solution onto a bake hardenable steel sheet, passing the liquid coated sheet through an induction heater, and induction heating the sheet at a temperature of 149°–227° C. for sufficient time to form a chromium bearing organic coating whereby the coating is resistant to dissolution of chromium and the steel sheet has a yield point elongation no greater than 0.3% and retains bake hardenability characteristics.

2. The method of claim 1 wherein the thermosetting resin is epoxy.

3. The method of claim 2 wherein the solution contains at least 10 wt. % epoxy.

4. The method of claim 1 wherein the solution contains at least 3 wt. % chromium trioxide.

5. The method of claim 1 wherein the temperature is $\geq 182°$ C.

6. The method of claim 1 wherein the temperature is $\leq 224°$ C. and the sheet is free of yield point elongation.

7. The method of claim 1 wherein the weight of the organic coating on the one side of the sheet is at least 0.7 $g/m^2$.

8. The method of claim 1 including the additional step of quenching the sheet to less than 149° C. within 30 seconds after completion of the induction heating.

9. The method of claim 8 wherein the sheet is quenched to ambient temperature.

10. The method of claim 2 wherein the coating has a coefficient of friction $\leq 0.15$.

11. The method of claim 2 including the additional steps of forming the epoxy coated sheet into a formed part and coating the formed part with paint.

12. The method of claim 11 wherein the part is formed without the aid of an external lubricant on the surface of the coating.

13. The method of claim 1 including the additional step of plating the one side of the sheet with zinc or a zinc alloy prior to the step of applying the liquid coating.

14. A method of forming a corrosion resistant organic coating on at least one side of a steel sheet, including the steps of:

providing an aqueous solution comprising at least 2 wt. % of a water dispersible or emulsifiable epoxy resin or a mixture of resins containing the epoxy resin, at least 0.5 wt. % of chromium trioxide and 25–97 wt. % water, coating a continuous liquid film of the solution onto a bake hardenable steel sheet, passing the liquid coated sheet through an induction heater, induction heating the sheet at a temperature of 149°–227° C. for sufficient time to form a chromium bearing epoxy coating, quenching the organically coated sheet to less than 149° C. within 30 seconds after completion of the induction heating whereby the coating is resistant to dissolution of chromium and the steel sheet has a yield point elongation no greater than 0.3% and retains bake hardenability characteristics, forming the epoxy coated sheet into a formed part, and coating the formed part with paint.

15. A method of forming a corrosion resistant organic coating on at least one side of a steel sheet, including the steps of:

providing an aqueous solution comprising at least 10 wt. % of a water dispersible or emulsifiable epoxy resin or a mixture of resins containing the epoxy resin, at least 3 wt. % of chromium trioxide and 25–97 wt. % water, coating a continuous liquid film of the solution onto a bake hardenable steel sheet, passing the liquid coated sheet through an induction heater, induction heating the sheet at a temperature of 182°–224° C. for sufficient time to form a chromium bearing cured epoxy coating, quenching the organically coated sheet to less than 149° C. within 30 seconds after completion of the induction heating whereby the coating is resistant to dissolution of chromium and the steel sheet is free of yield point elongation and retains bake hardenability characteristics, the coating on the one side of the sheet being at least 0.7 $g/m^2$, forming the epoxy coated sheet into a formed part, and coating the formed part with paint.

\* \* \* \* \*